United States Patent
Haase et al.

(10) Patent No.: US 7,120,575 B2
(45) Date of Patent: Oct. 10, 2006

(54) METHOD AND SYSTEM FOR THE AUTOMATIC SEGMENTATION OF AN AUDIO STREAM INTO SEMANTIC OR SYNTACTIC UNITS

(75) Inventors: Martin Haase, Tuebingen (DE); Werner Kriechbaum, Ammerbuch-Breitenholz (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 09/920,983

(22) Filed: Aug. 2, 2001

(65) Prior Publication Data
US 2002/0010575 A1    Jan. 24, 2002

(30) Foreign Application Priority Data
Apr. 8, 2000    (DE)    ................................ 001 16 861

(51) Int. Cl.
G10L 11/04    (2006.01)
(52) U.S. Cl. ...................... 704/207; 704/209; 704/205; 704/214
(58) Field of Classification Search ................ 704/288, 704/207–210, 213–220, 205, 206; 379/388.04; 381/92
See application file for complete search history.

(56) References Cited

U.S. PATENT DOCUMENTS 4,741,038 A * 4/1988 Elko et al. ..................... 381/92
5,448,679 A * 9/1995 McKiel, Jr. ................... 704/208
5,774,837 A * 6/1998 Yeldener et al. ............. 704/208
5,867,574 A * 2/1999 Eryilmaz ................. 379/388.04

OTHER PUBLICATIONS

"Accurate Short-Term analysis of the Fundamental Frequency and the Harmonics-to-Noise Ratio of a Sampled Sound", By Paul Boersma, Institute of Phonetic Sciences, University of amsterdam, Proceedings 17 (1993), 97-110.
"Prosody-based Automatic Segmentation of speech into sentences and Topics", Elizabeth Shribert, andreas Stolcke, Dilek Hakkani-Tur, Gokhan Tur, Speech Communication 32 (2000) 127-154.
Automatic Detection of Sentence Boundaries and Disfluencies Based on Recognized Words, A. Stokcke, et al, Speech Technology & Research Laboratory SRI International, Menlo Park, CA.
"A Silence/Noise/Music/Speech Splitting Algorithm", C. Montacie, et al, LIP6—University Pierre et Marie Curie 4,place Jussieu—75252 Paris cedex 05—France.

* cited by examiner

Primary Examiner—Richemond Dorvil
Assistant Examiner—Huyen X. Vo
(74) Attorney, Agent, or Firm—Duke W. Yee; Jerry W. Herndon; Peter B. Manzo (57) ABSTRACT

A digitized speech signal (600) is input to an F0 (fundamental frequency) processor that computes (610) a continuous F0 data from the speech signal. By the criterion voicing state transition (voiced/unvoiced transitions) the speech signal is presegmented (620) into segments. For each segment (630) it is evaluated (640) whether F0 is defined or not defined i.e. whether F0 is ON or OFF. In case of F0=OFF a candidate segment boundary is assumed as described above and, starting from that boundary, prosodic features are computed (650). The feature values are input into a classification tree and each candidate segment is classified thereby revealing, as a result, the existence or non-existence of a semantic or syntactic speech unit.

11 Claims, 7 Drawing Sheets

METHOD AND SYSTEM FOR THE AUTOMATIC SEGMENTATION OF AN AUDIO STREAM INTO SEMANTIC OR SYNTACTIC UNITS

BACKGROUND OF THE INVENTION

The present invention relates to computer-based automatic segmentation of audio streams like speech or music into semantic or syntactic units like sentence, section and topic units, and more specifically to a method and a system for such a segmentation wherein the audio stream is provided in a digitized format.

Prior to or during production of audiovisual media like movies or broadcasted news a huge amount of raw audio material is recorded. This material is almost never used as recorded but subjected to editing, i.e. segments of the raw material relevant to the production are selected and assembled into a new sequence.

Today this editing of the raw material is a laborous and time-consuming process involving many different steps, most of which require human intervention. A crucial manual step during the preprocessing of the raw material is the selection of cut points, i.e. the selection of possible segment boundaries, that may be used to switch between different segments of the raw material during the subsequent editing steps. Currently these cut points are selected interactively in a process that requires a human to listen for potential audio cut points like speaker changes or the end of a sentence, to determine the exact time at which the cut point occurs, and to add this time to an edit-decision list (EDL).

For the above reasons there is a substantial need to automate part or even all of the above preprocessing steps.

Many audio or audio-visual media sources like real media streams or recordings of interviews, conversations or news broadcasts are available only in audio or audio-visual form. They lack in corresponding textual transcripts and thus in typographic cues such as headers, paragraphs, sentence punctuation, and capitalization that would allow for segmentation of those media streams only by linking transcript information to audio (or video) information as proposed in U.S. patent application Ser. No. 09/447,871 filed by the present assignee. But those cues are absent or hidden in speech output.

Therefore a crucial step for the automatic segmentation of such media streams is automatic determination of semantic or syntactic boundaries like topics, sentences and phrase boundaries.

There exist approaches that use prosody whereby prosodic features are those features that have not only influence on single media stream segments (called phonemes) but extend over a number of segments. Exemplary prosodic features are information extracted from the timing and melody of speech like pausing, changes in pitch range or amplitude, global pitch declination, or melody and boundary tone distribution for the segmentation process.

As disclosed in a recent article by E. Shriberg, A. Stolcke et al. entitled "Prosody-Based Automatic Segmentation of Speech into Sentences and Topics", published as pre-print to appear in Speech Communication 32(1-2) in September 2000, evaluation of prosodic features usually is combined with statistical language models mainly based on Hidden Markov Theory and thus presume words already decoded by a speech recognizer. The advantage to use prosodic indicators for segmentation is that prosodic features are relatively unaffected by word identity and thus improve the robustness of the entire segmentation process.

A further article by A. Stolcke, E. Shriberg et al. entitled "Automatic Detection of Sentence Boundaries and Disfluencies Based on Recognized Words", published as Proceedings of the International Conference on Spoken Language Processing, Sydney, 1998, concerns also segmentation of audio streams using a prosodic model and is accordingly based on speech already transcribed by an automatic speech recognizer.

In the above at first cited article, prosodic modeling is mainly based on only very local features, whereby for each inter-word boundary prosodic features of the word immediately preceding and following the boundary, or alternatively within an empirically optimized window of 20 frames before and after the boundary, arc analyzed. In particular, prosodic features are extracted that reflect pause durations, phone durations, pitch information, and voice quality information. Pause features are extracted at the inter-word boundaries. Pause duration, a fundamental frequency (F0), and voice quality features are extracted mainly from the word and window preceding the boundary. In addition, pitch-related features reflecting the difference in pitch across the boundary are included in the analysis.

In the above article by E. Shriberg et al., chapter 2.1.2.3, generally refers to a mechanism for determining the F0 signal. A similar mechanism according to the invention will be discussed in more detail later referring to FIG. 3. The further details of the F0 processing are of no relevance for the understanding of the present invention.

As mentioned above, the segmentation process disclosed in the pre-cited article is based on language modeling to capture information about segment boundaries contained in the word sequences. That described approach is to model the joint distribution of boundary types and words in a Hidden Markov Model (HMM), the hidden variable being the word boundaries. For the segmentation of sentences it is therefore relied on a hidden-event N-gram language model where the states of the HMM consist of the end-of-sentence status of each word, i.e. boundary or no-boundary, plus any preceding words and possible boundary tags to fill up the N-gram context. As commonly known in the related art, transition probabilities are given by N-gram probabilities that in this case are estimated from annotated, boundary-tagged user-specific training data.

Concerning segmentation, the authors of that article further propose use of a decision tree where a number of prosodic features are used that fall into different groups. To designate the relative importance of these features in the decision tree, a measure called "feature usage" is utilized that is computed as the relative frequency with which that feature or feature class is queried in the decision tree. The prosodic features used are pause duration at a given boundary, turn/no turn at the boundary, F0 difference across the boundary, and rhyme duration.

The above cited prior art approaches have the drawback that they either necessarily use a speech recognizer or that they require multiple processing steps. The entire known segmentation process is error-prone, i.e. has to rely on speech recognizer output, and is time-consuming. In addition, most of the known approaches use complex mechanisms and technologies and thus their technical realization is rather cost-extensive.

SUMMARY OF THE INVENTION

It is therefore an object of the present invention to provide a method and an apparatus for segmentation of audio streams that perform the segmentation as automatic as possible.

A further object is to provide such a method and apparatus that can be implemented with minimum technical efforts and requirements thus being minimum cost-extensive.

It is another object to provide such a method and apparatus that perform the segmentation of audio streams as robust as possible.

It is another object to provide such a method and system that allows for segmentation of a continuous audio stream without the provision of any corresponding transcript.

Another object is to provide an automatic, real-time system for the predescribed segmentation of audio streams.

Yet another object is to provide such a method and apparatus that allows for a not user-specific segmentation of audio streams.

The objects are solved by the features of the independent claims. Advantageous embodiments of the invention are subject matter of the dependent claims.

The invention accomplishes the foregoing by determining a fundamental frequency for the digitized audio stream, detecting changes of the fundamental frequency in the audio stream, determining candidate boundaries for the semantic or syntactic units depending on the detected changes of the fundamental frequency, extracting at least one prosodic feature in the neighborhood of the candidate boundaries, and determining boundaries for the semantic or syntactic units depending on the at least one prosodic feature.

The idea or concept underlying the present invention is to provide a pre-segmentation of the audio stream and thereby obtain potential or candidate boundaries between semantic or syntactic units, preferably based on the fundamental frequency F0. The concept is based on the observation that sonorant i.e. voiced audio segments, which are characterized by F0=ON according to the invention, only rarely extend over two semantic or syntactic units like sentences.

It is emphasized that the candidate boundaries are obtained by applying only one criterion namely whether F0 is ON or OFF.

Based on the obtained candidate boundaries, prosodic features are extracted at these boundaries, preferably in both (time) directions starting from a particular candidate boundary. In particular, continuous features relevant for prosody are used.

In a preferred embodiment of the invention, an index function is defined for the fundamental frequency having a value=0 if the fundamental frequency is undefined and having a value=1 if the fundamental frequency is defined. It is, among others, the so-called Harmonics-to-Noise-Ratio that allows for the predication whether the F0 is defined or undefined using a threshold value (see Boersma(1993) for details). The index function allows for an automatization of the pre-segmentation process for finding candidate boundaries and thus the following steps of processing prosodic features can be performed automatically too at the candidate boundaries.

BRIEF DESCRIPTION OF THE DRAWINGS

The invention will be understood more readily from the following detailed description when taken in conjunction with the accompanying drawings, in which.

DETAILED DESCRIPTION OF THE DRAWINGS

Figure 1:
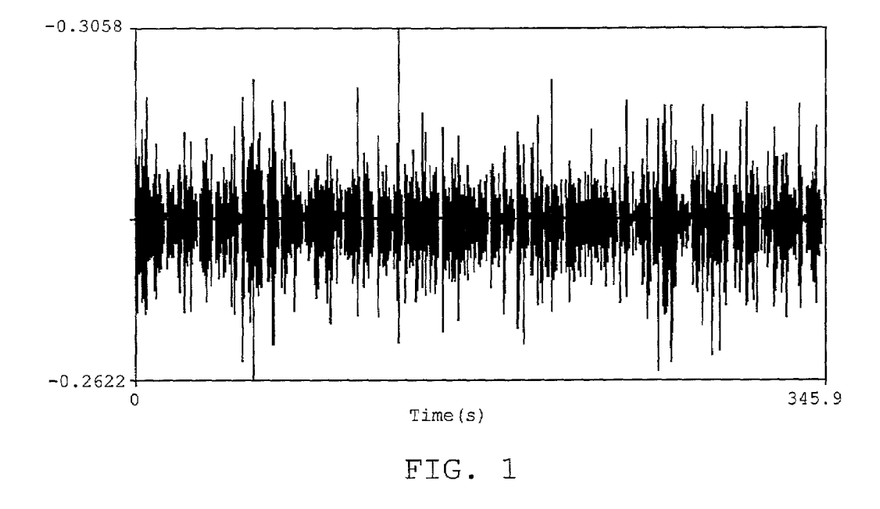
FIG. 1 is a piece cut out from a typical continuous audio stream which can be segmented in accordance with the invention.

FIG. 1 shows a piece cut out from a digitized continuous speech signal. The original audio stream is digitized using known digitizing tools, e.g. wav or mpg-format generating software, and stored in a file as a continuous stream of digital data. It is emphasized hereby that the below described mechanism for segmentation of such an audio stream can be accomplished either in an off-line or a real-time environment. In addition, it can be implemented so that the different procedural steps are performed automatically.

It is also noted that potential semantic or syntactic units, in which the audio stream can be segmented, are paragraphs, sentences or changes from one speaker to another speaker or even video scenes in case of audio-visual streams segmented via the audio part.

In a first step (not shown here) the digitized audio stream is segmented into speech and non-speech segments by means of algorithms as known in the art, e.g. the one described in an article by Claude Montacié, entitled "A Silence/Noise/Music/Speech Splitting Algorithm", published in Proceeding of the International Conference on Spoken Language Processing, Sydney, 1998. By that step it is guaranteed that the following steps will only be applied to speech segments.

Figure 2:
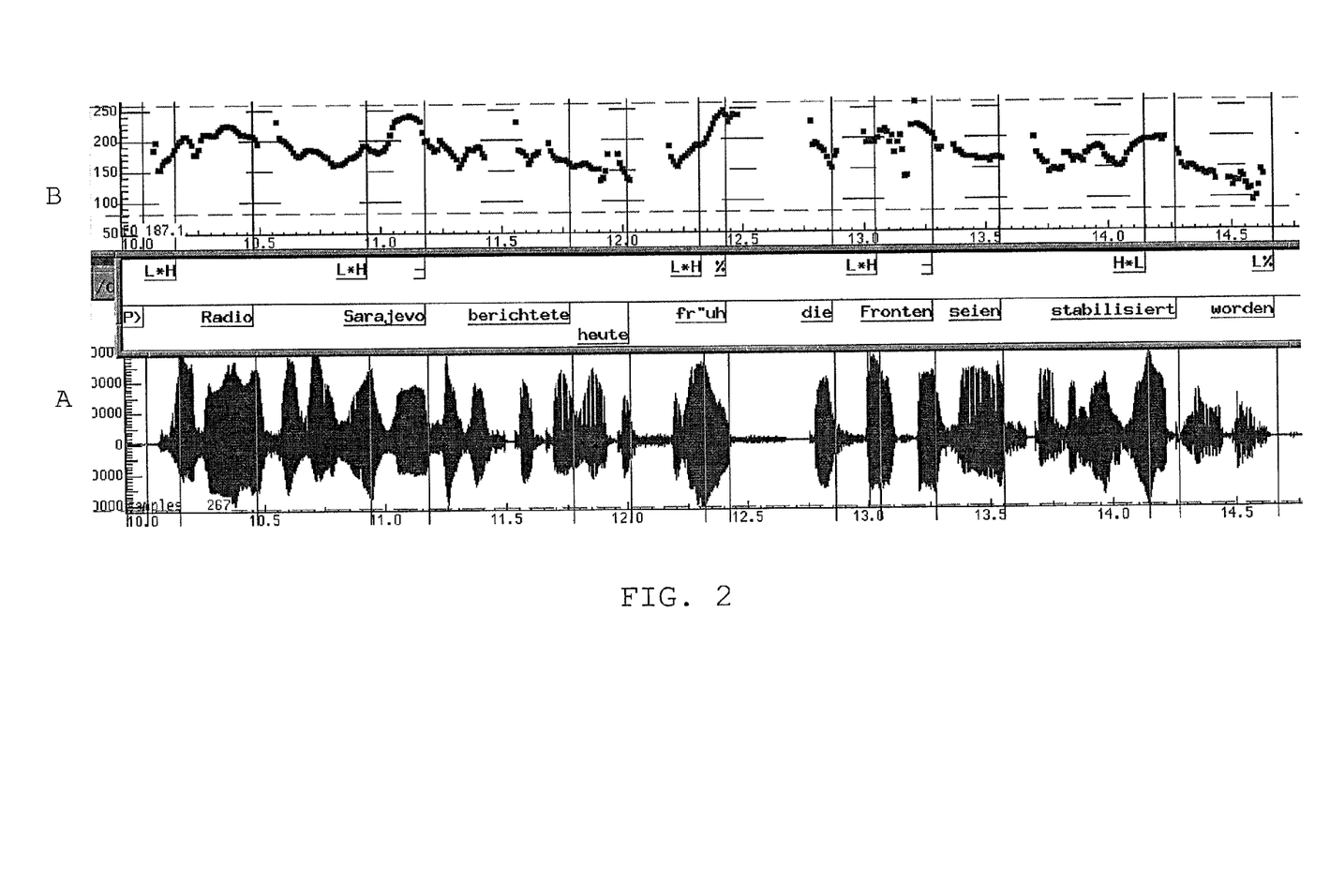
FIG. 2 depicts typical F0 data b. calculated from a real life speech signal A.

In a next step, the fundamental frequency of the audio stream is continuously determined by use of a processor depicted in FIG. 3 and described later in more detail. FIG. 2a depicts a piece cut out from an audio stream as shown in FIG. 1, wherein FIG. 2b shows an F0 contour determined from the audio piece shown in FIG. 2a.

An applicable algorithm for the F0 processing is described in detail in an article by Paul Boersma (1993): "Accurate short-term analysis of the fundamental frequency and the harmonics-to-noise ratio of a sampled sound", Proceedings of the Institute of Phonetic Sciences of the University of Amsterdam 17: 97–110.

The fundamental frequency F0 is the component of the spectrum of a periodic signal that comprises the longest period. To calculate it in the time domain an autocorrelation function is used whereby the fundamental frequency F0 can be obtained from the inverse of the signal period since the autocorrelation function is maximum for multiples of the period. In practice the audio signal is scanned by a window.

The above algorithm thus performs an acoustic periodicity detection on the basis of an accurate autocorrelation method based on cepstrum or combs, or the original autocorrelation methods. Boersma recognized the fact that if one wants to estimate a signal's short-term autocorrelation function on the basis of a windowed signal, the autocorrelation function of the windowed signal should be divided by the autocorrelation function of the window. For the further details it is referred to the above cited article which is regarded to be fully incorporated by reference.

Figure 3:
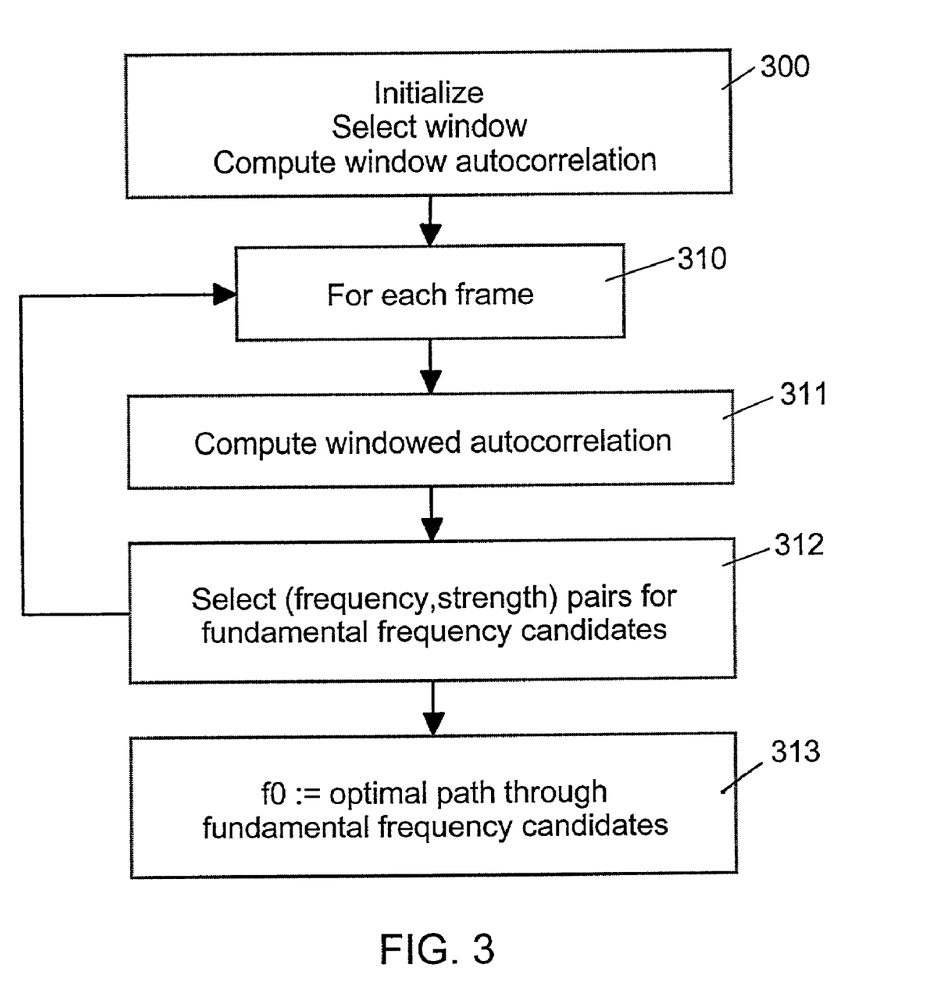
FIG. 3 is a block diagram of an apparatus for processing F0 according to the prior art.

FIG. 3 shows a block diagram of a simplified algorithm for the F0 detection in a digitized signal according to the previously cited article of P. Boersma (1993).

In a first step parameters like e.g. the frame length are initialized, a windowing function is selected and the autocorrelation function of the window is computed. Any windowing function used in signal processing applications can be used as a window, the preferred window function is a Gaussian window.

For each frame the following computations are performed: The windowed autocorrelation rx of the frame is computed. The windowed autocorrelation is defined as the normalized autocorrelation of the windowed signal ra divided by the normalized autocorrelation of the window rw. Normalization is carried out by dividing the autocorrelation by the value at lag zero. The following equations summarize the predescribed procedure:

$$r_x(\varepsilon^-) = \frac{r_a(\tau)}{r_w(\tau)}$$

$$r_a(\tau) = \frac{\int_0^{T-\tau} a(t)a(t+\tau)dt}{\int_0^T a^2(t)dt}$$

where the variables are:
T duration of the frame
a(t) the windowed signal shifted to mean 0
tau lag From the windowed autocorrelation at most n (frequency, strength) coordinates of candidates for the fundamental frequency are selected according to the following rules:
The preferred value for n is 4
The local maxima of the windowed autocorrelation are determined by parabolic interpolation
The first candidate is the unvoiced
The other candidates are the first n−1 maxima with the highest local strength
The strength R of the unvoiced candidate is computed according to $$R = a + \max\left(0, 2 - \frac{(\text{Local absolute peak})/b}{c/(1+a)}\right)$$

The preferred value for the constant a is a threshold for voicedness, for the constant b the maximal amplitude of the signal, and for c a threshold for silence.

The strength R of the other candidates is computed according to $$R = a + \max\left(0, 2 - \frac{(\text{local absolute peak})/b}{c/(1+a)}\right)$$

where tau is the lag of the local maximum. The preferred value for d is 0.01, and for e the frequency minimum for the fundamental frequency.

$$R = r(\tau) - d^2 \log(e \cdot \tau)$$

Using well known dynamic programming algorithms, a path through the candidate fundamental frequencies is selected that minimizes the cost for voiced/unvoiced transitions and for octave jumps. The cost function is given by $$cost(\{p_n\}) = \sum_{n=2}^{numberOfFrames} transitionCost(F_{n-1,p_{n-1}}, F_{np_n}) - \sum_{n=1}^{numberOfFrames} R_{np_n}$$

where
pn path through the candidates
F frequency of candidate
R strength of candidate
The preferred values for VoicedUnvoicedCost and OctaveJumpCost parameters are 0.2.

The result of the F0 processing is a pre-segmentation of the audio stream into segments where the segment boundaries comprise transitions between voiced and unvoiced audio sections.

$$transitionCost(F_1, F_2) = \begin{cases} 0 & \text{if } F_1 = 0 \text{ and } F_2 = 0 \\ VoiceUnvoiceCost & \text{if } F_1 = 0x \text{ or } R_2 = 0 \\ OctaveJumpCost \cdot \left|^2\log\frac{F_1}{F-2}\right| & \text{if } F_1 \neq 0 \text{ and } F_2 \neq 0 \end{cases}$$

Figure 4A:
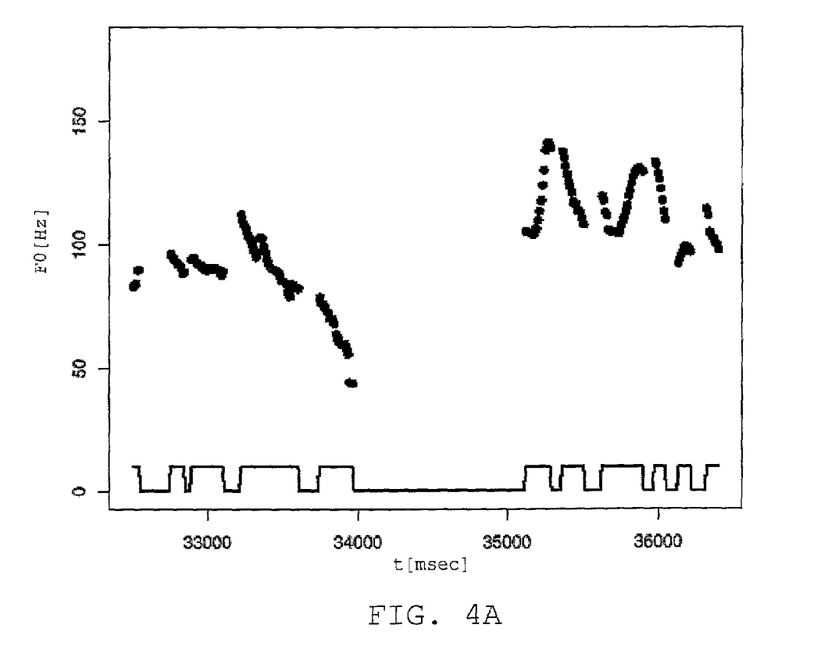
FIG. 4a–c are diagrams for illustrating the method for segmentation of audio streams according to the invention.
Figure 4B:
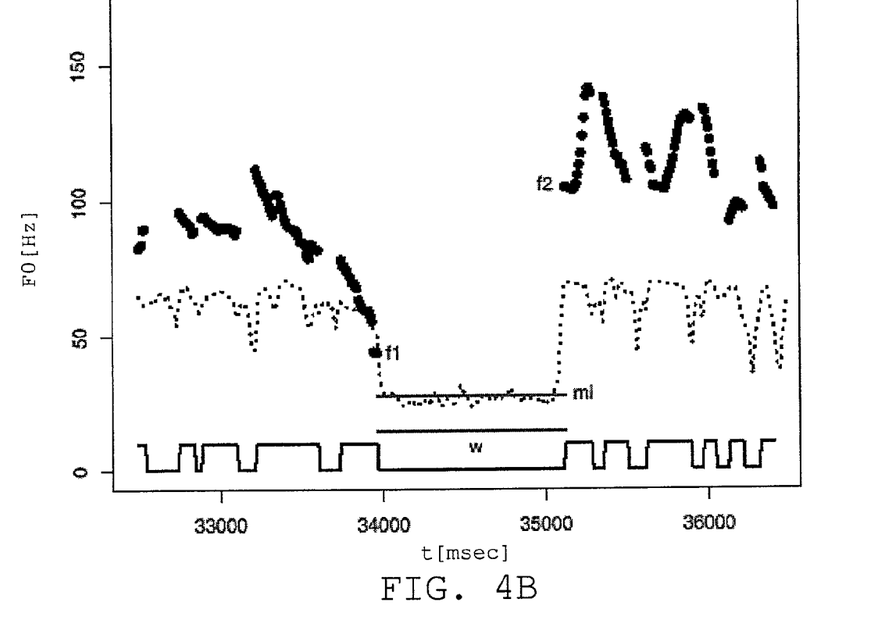
Figure 4C:
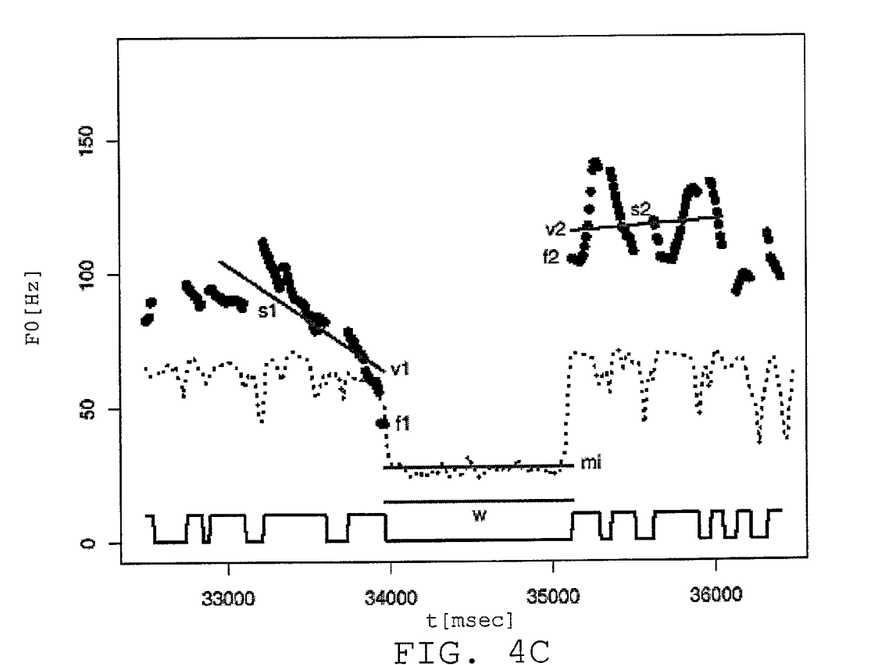

The extraction of prosodic features is illustrated now referring to FIGS. 4a–4c.

FIG. 4a shows a plot of F0 (in units of Hertz) over time (in units of milliseconds). The sampling rate is 10 milliseconds and thus the time distances between the plotted data is also 10 msec so far as they are not interrupted by voiceless sections. Near its center, between 34000 and 35000 msec, the plot comprises such a voiceless section that, in the underlying audio stream, separates two sentences. At the bottom of the diagram, an index function comprising values 1 (=ON) and 0 (=OFF) is depicted which is ON for voiced sections and OFF for voiceless sections of the audio stream.

The plot diagram shown in FIG. 4b, in addition to the F0 data, depicts intensity data (smaller dots) in units of decibel. The extraction of prosodic features is generally performed in the environment of voiceless sections where F0 is OFF, as the depicted section between 34000 and 35000 msec for a time duration larger than a threshold value, e.g. 100 msec. A first feature is the length w of the voiceless section which strongly correlates with the length of pauses. In other words, the longer w is the more likely the section comprises a pause of the same length w. The features F1 and F2 represent the F0 values at the boundaries of the voiceless section w called Offset F1 and Onset F2. F1 is the F0 offset before the voiceless section w and F2 is the F0 onset after the voiceless section w. The Offset F1 is of greater importance than the Onset F2 since it has been found that F0 at the end of an audio segment of spoken language in most cases is lower than the average value.

A further prosodic feature is the difference F2−F1. It has been found that a speaker after a segment boundary in most cases does not continue with the same pitch, thus resulting in a so-called pitch reset.

Another prosodic feature is the arithmetic mean MI of the signal intensity within the voiceless section w. Using that feature it is possible to distinguish consecutive unvoiced sounds from real pauses.

Besides the above features, the following prosodic features can be extracted from the slope of the F0 contour depicted in FIGS. 4A and 4B which is illustrated by reference to FIG. 4C. The declination within semantic units like sentences and phrases is used to detect semantic unit boundaries or ends. The problem is that it is rather difficult to extract this feature information from F0 out of a continuous audio stream, since a standard linear regression can be performed only if the boundaries are already known. The present invention solves this by performing a linear regression only in the voiced sections directly preceding or succeeding the voiceless section W1 and only within a predetermined time window, i.e. in the present case starting from 34000 msec to the lefthand and from 35000 to the righthand. The predetermined time window preferably is 1000 msec.

As prosodic features, the slopes S1 and S2 of the obtained regression lines (in units of Hz/s) and/or the F0 values V1, V2 at the positions of F1 and F2 but estimated through the regression, can be extracted. The advantage for using V1 and V2 instead of F1 and F2 is that determination of the F0 values at F1 (Offset) and F2 (Onset) is rather faulty due to the transient behavior of the spoken language at these boundaries. In accordance with F1 and F2, also the difference V2−V1 can be used as a prosodic feature.

The fundamental frequency itself can be used as prosodic feature. As mentioned above, it has been observed that the fundamental frequency in most cases declines continuously along a spoken sentence. It is also observed that nonvocal sections in a speech stream correspond to gaps in the according fundamental frequency contour.

In a further embodiment at least two features are utilized, e.g. F0 (voiced-voiceless) and the audio signal intensity. Combining two features enhances robustness of the proposed mechanism.

In addition to the predetermined time interval of 1000 msec, the robustness of the proposed mechanism can be enhanced by extracting corresponding features also within varied time intervals of e.g. 500, 2000, and 4000 msec and comparing the results.

Figure 5A:
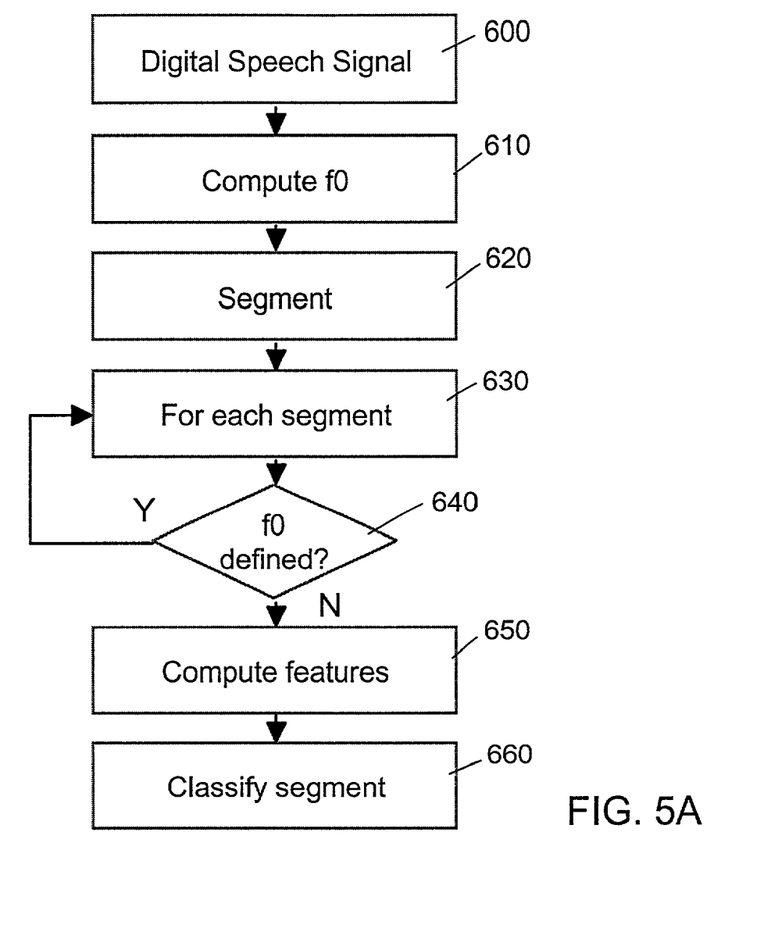
FIG. 5a–c are flow diagrams for illustrating procedural steps of audio segmentation according to the invention.
Figure 5B:
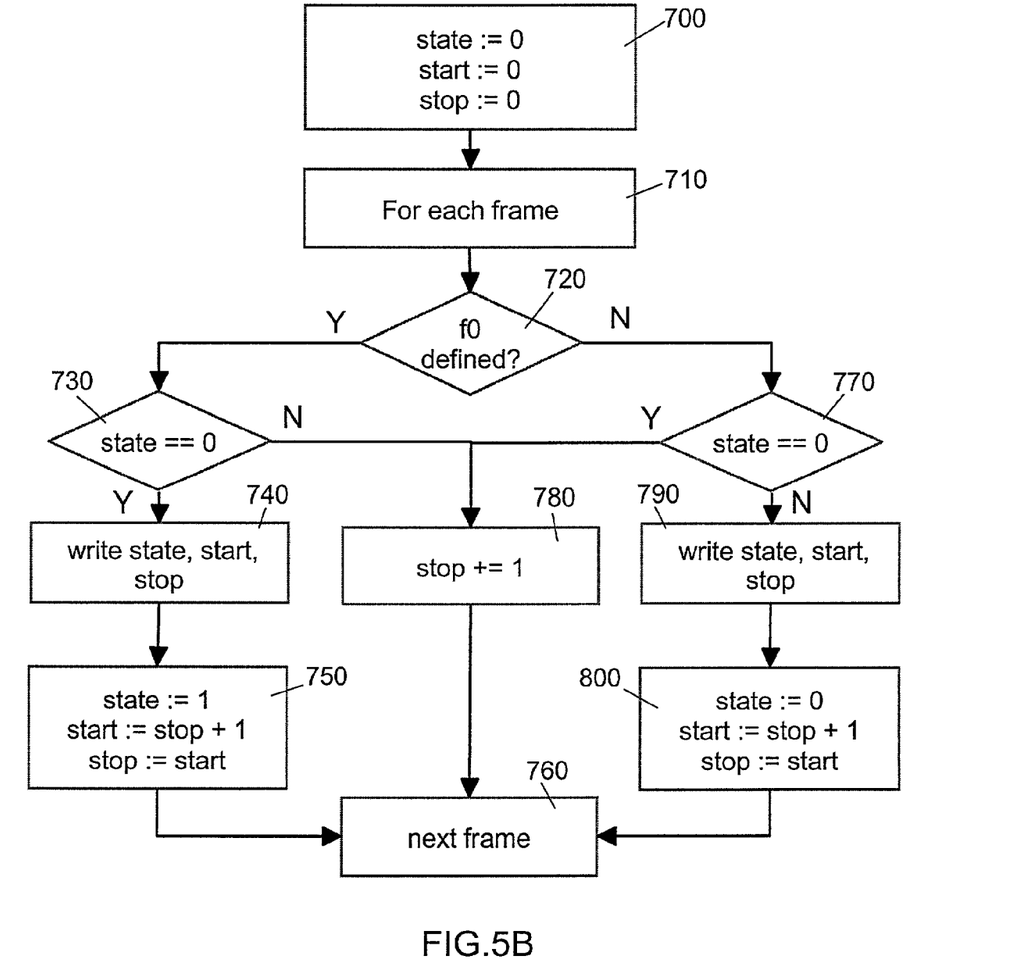
Figure 5C:
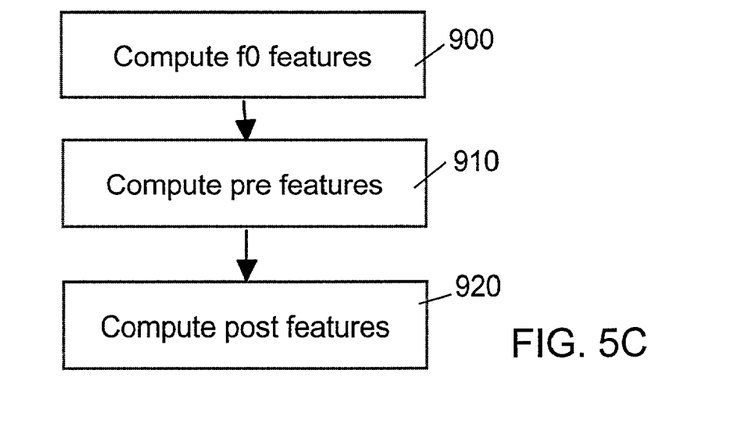

The flow diagrams depicted in FIGS. 5A–5C illustrate procedural steps for the segmentation of continuous speech in accordance with the invention.

In FIG. 5A, a digitized speech signal 600 is input to an F0 processor depicted in FIG. 3 that computes 610 a continuous F0 data from the speech signal. Only by the criterion F0 =ON/OFF, as described beforehand, the speech signal is presegmented 620 into speech segments. For each segment 630 it is evaluated 640 whether F0 is defined or not defined. In the case of a not defined F0 (i.e. F0=OFF) a candidate segment boundary is assumed as described above and, starting from that boundary, prosodic features will be computed 650. The feature values are input into a classification tree (see FIG. 6) and each candidate segment is classified thereby revealing, as a result, the existence or non-existence of a semantic or syntactic speech unit.

The Segmentation step 620 in FIG. 5A is depicted in more detail in FIG. 5B. After initializing 700 variables "state", "start" and "stop", for each segment (frame) 710 it is checked whether F0 is defined (=ON) or not defined (=OFF) 720. In case of F0=ON, it is further checked 730 whether the variable "state" is equal zero or not. If so, it is written 740 to the variables "state", "start " and "stop" whereby "state" is set 1, "start" is set "stop" +1 and "stop" is set to the current value of "start" 750. Thereafter it is continued with a new segment (frame).

In case step 720 reveals that F0 is not defined, i.e. F0=OFF, it is also checked 770 whether variable "state" is d0. If so, variable "stop" is set to 0 and thereafter processing is continued 760 with a next frame. If variable "state" is not 0, it is written 790 to the three variables whereby variable "state" is set to 0, "start" is set "stop" +1 and "stop" is set to the current value of "start" 800.

The Compute features step 650 shown in FIG. 5A is now depicted in more detail referring to FIG. 5C. In a first step 900, starting from a candidate boundary with F0=OFF, F0 itself is used as a prosodic feature and computed accordingly. In a further step 910, prosodic features in a time window lying before the candidate boundary are computed. In a next step 920, prosodic features are computed in a time window lying after the candidate boundary.

Figure 6:
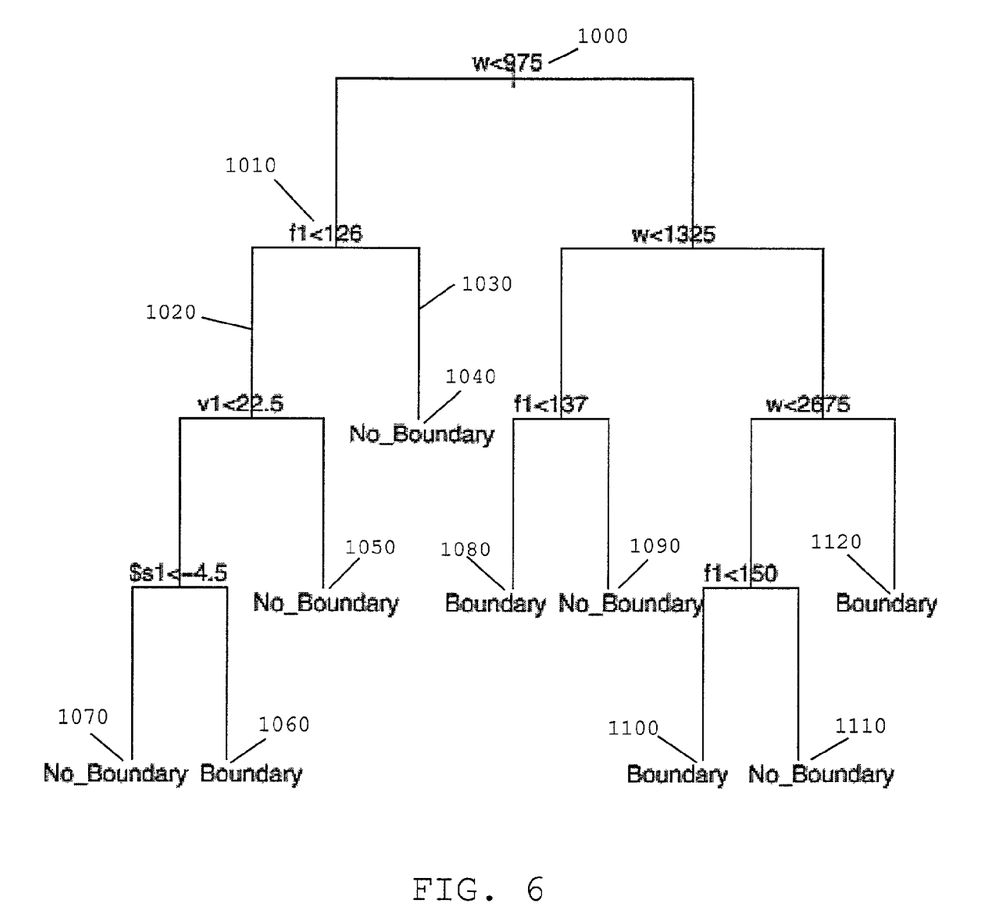
FIG. 6 is an exemplarily trained tree structure used for an audio segmentation process according to the invention.

FIG. 6 shows an exemplary embodiment of a binary decision or classification tree which is trained by way of analyzing sample text bodies and which comprises the same prosodic features depicted in FIGS. 4A–4C (with the only exception of feature MI). Starting from the root node 1000, at each node a feature is questioned and, depending on the obtained value, it is decided on which path it is continued. If, for example, at node 1010 the question F1 <126 is answered with YES then it is continued on a left branch 1020 and in case of the answer NO on the right branch 1030. Reaching one of the end nodes 1040–1120, a decision is made on whether a semantic boundary has been found or not. In case a boundary has been found, an underlying edit decision list (EDL) can be updated accordingly or the audio stream can be segmented at the boundaries thus revealing audio segments.

For the training of such a classification tree, a certain amount of training data in the same field as the intended application need to be gathered beforehand. This comprises speech data and the corresponding textual representation. The latter allows for the determination of syntactic or semantic boundaries from punctuation etc. present in the text. With a system that allows for the linking of audio data with the corresponding reference text (e.g. precited European Patent Application X XXX XXX (docket no. DE9-1999-0053 of present applicant) the semantic or syntactic segment boundaries in the audio can be inferred from the corresponding boundaries in the text. Having trained the classification tree, the textual representation of audio data in the desired application is not needed.

It is noted again hereby that, for the approach according to the present invention, there is no need for a speech recognizer to be invoked in the segmentation process.

Although the invention is preferably applicable in the field of speech recognition or in the above described field of automatic generation of EDLs it is understood that it can advantageously be applied to other technical fields of audio processing or preprocessing.

The invention claimed is:

1. A method for the segmentation of an audio stream into semantic or syntactic units wherein the audio stream is provided in a digitized format, comprising the steps of:
    determining a fundamental frequency for the digitized audio stream;
    detecting changes of the fundamental frequency in the audio stream, wherein detecting the changes of the fundamental frequency includes providing a threshold value for estimates of the fundamental frequency's voicedness and determining whether the voicedness of the fundamental frequency estimates are higher or lower than the threshold value, and wherein the voicedness of the fundamental frequency estimates lower than the threshold value equals no voice, and wherein the voiceness of the fundamental frequency estimates higher than the threshold value equals voice;

determining candidate boundaries for the semantic or syntactic units depending on the detected changes of the fundamental frequency;

extracting a plurality prosodic features in an environment of the audio stream where the voicedness of the fundamental frequency estimates are lower than the threshold value, wherein the environment is a period of time between 500 and 4000 milliseconds preceding and following the candidate boundaries;

combining the plurality of prosodic features; and determining boundaries for the semantic or syntactic units depending only on the combined plurality of prosodic features.

2. The method according to claim 1, wherein defining an index function for the fundamental frequency having a value=0 if the voicedness of the fundamental frequency is lower than the threshold value and having a value=1 if the voicedness of the fundamental frequency is higher than the threshold value.

3. The method according to claim 2, wherein extracting the phurality of prosodic features is in an environment of the audio stream where the value of the index function is =0.

4. The method according to claim 1, wherein at least one prosodic feature is represented by the fundmnental frequency.

5. The method according to claim 1, further comprising first detecting speech and non-speech segments in the digitized audio stream and performing the steps of claim 1 thereafter only fbr detected speech segments.

6. The method according to claim 5, wherein the detecting of speech and non-speech segments comprises utilizing the signal energy or signal energy changes, respectively, in the audio stream.

7. The method according to claim 1, further comprising the step of performing a prosodic feature classification based on a predetermined classification tree.

8. An article of manufacture comprising a computer usable medium having computer readable program code means embodied therein for causing segmentation of an audio steam into semantic or syntactic units, wherein the audio stream is provided in a digitized format, the computer readable program code means in the article of manufacture comprising computer readable program code means for causing a computer to effect:

determining a fundamental frequency for the digitized audio stream;

detecting changes of the fundamental frequency in the audio stream, wherein detecting the changes of the fundamental frequency includes providing a threshold value for estimates of the fundamental frequency's voicedness and determining whether the voicedness of the fundamental frequency estimates are higher or lower than the threshold value, and wherein the voicedness of the fundamental frequency estimates lower than the threshold value equals no voice, and wherein the voiceness of the fundamnental frequency estimates higher than the threshold value equals voice;

determining candidate boundaries for the semantic or syntactic units depending on the detected changes of the fundamental frequency;

extracting a plurality of prosodic features in an environment of the audio stream where the voiceness of the fundamental frequency estimates are lower than the threshold value, wherein the environment is a period of time between 500 and 4000 milliseconds preceding and following the candidate boundaries;

combining the plurality of prosodic features; and determining boundaries for the semantic or syntactic units depending only on the combined plurality of prosodic features.

9. A digital audio processing system for segmentation of a digitized audio stream into semantic or syntactic units comprising:

means for determining a fundamental frequency for the digitized audio stream;

means for detecting changes of the fundamental frequency in the audio stream, wherein detecting the changes of the fundamental frequency includes providing a threshold value for estimates of the fundamental frequency's voicedness and determining whether the voicedness of the fundamental frequency estimates are higher or lower than the threshold value, and wherein the voicedness of the fundamental frequency estimates lower than the threshold value equals no voice, and wherein the voicedness of the fundamental frequency estimates higher than the threshold value equals voice;

means for determining candidate boundaries for the semantic or syntactic units depending on the detected changes of the fundamental frequency;

means for extracting a plurality of prosodic features in an environment of the audio stream where the voicedness of the fundamental frequency estimates are lower than the threshold value, wherein the emvironment is a period of time between 500 and 4000 milliseconds preceding and following the candidate boundaries;

means for combining the plurality of prosodic features; and means for determining boundaries for the semantic or syntactic units depending only on the combined plurality of prosodic features.

10. An audio processing system according to claim 9, further comprising means for generating an index function for the voicedness of the fundamental frequency having a value=0 if the voicedness of the fundamental frequency is lower than a predetermined threshold value and having a value=1 if the voicedness fundamental frequency is higher than the threshold value.

11. Audio processing system according to claim 9 or 10, further comprising means for detecting speech and non-speech segments in the digitized audio stream, particularly for detecting and analyzing the signal energy or signal energy changes, respectively, in the audio stream.

* * * * *